OHMIC CONTACTS CONSISTING OF A FIRST LEVEL OF MOLYBDENUM-GOLD-MIXTURE OF GOLD AND VANADIUM AND A SECOND LEVEL OF MOLYBDENUM-GOLD

Filed Dec. 30, 1966

United States Patent Office 3,434,020

Patented Mar. 18, 1969

3,434,020

OHMIC CONTACTS CONSISTING OF A FIRST LEVEL OF MOLYBDENUM-GOLD MIXTURE OF GOLD AND VANADIUM AND A SECOND LEVEL OF MOLYBDENUM-GOLD

Edward M. Ruggiero, Dallas, Tex., assignor to Texas Instruments Incorporated, Dallas, Tex., a corporation of Delaware Filed Dec. 30, 1966, Ser. No. 606,348
U.S. Cl. 317—235 9 Claims
Int. Cl. H01l *19/00, 3/00*

The invention relates to the provision of alternate layers or films of metal and electrical insulating material to form lead and interconnection patterns for semiconductor devices, particularly for semiconductor devices of the integrated circuit type.

The increased demand for microminiaturization has been reflected in the field of electronics by the development of semiconductor integrated circuits or networks, whereby a plurality of active and/or passive circuit components are formed in or on a single slice of semiconductor material, each of the circuit components thereafter being interconnected in a particular manner to provide the desired circuit function. For example, an integrated circuit device of the monolithic type may have a number of transistors and resistors formed by diffusion beneath one major face of a slice or wafer of semiconductor material (a suitable example being silicon), a protective layer (usually of silicon oxide) upon the face of the wafer, and metallic films upon the oxide layer interconnecting the resistors and the various regions of the transistors in a desired pattern through apertures in this oxide. With increasing complexity of circuitry, however, and the corresponding increase in complexity of the interconnection pattern, it has become necessary to form more than one level of metallic film interconnections, with adequate electrical insulation or isolation between the various levels at the crossover points. This is particularly true when, upon a single slice of semiconductor material, a plurality of separate circuits are formed and it becomes necessary to interconnect the circuits for cooperative action to produce one unitary circuit function.

In addition, in the area of hybrid integrated circuits, a plurality of active circuit components are formed within a single substrate of semiconductor material, a metallized pattern is formed over the substrate to interconnect the various components, and an electrical insulator is deposited over the metallized pattern. Holes are then cut in this insulator, another second level electrical connection lead pattern is deposited on the insulator to contact the first level pattern in and through the holes, and the entire assembly is inverted and mounted upside down on a ceramic substrate, the second level contact pattern lining up and mating with a metallized lead pattern on the face of the ceramic.

The materials of which the metal films and the electrical insulating layer or layers are formed must in themselves exhibit favorable chemical, electrical, thermal, and mechanical properties, including compatibility with one another to provide an adequate multi-level contact and interconnection system. For example, the metallic film or films of the first level should adhere well to the protective layer of oxide upon the face of the slice or wafer, should not unduly alloy with the semiconductor material at temperatures encountered in the processing or packaging of the device so as to degrade device characteristics, and should not have a melting point below the temperature to which the device will be exposed during processing and device operation. The insulating material between levels of metal films, on the other hand, should afford adequate electrical isolation and be substantially free of pinholes to avoid the possibility of electrical shorting between levels.

In addition, the entire system should be fabricated of metals and insulators or oxides which are hard, structurally strong materials that will not yield or break up during wafer or slice handling and testing; all of the materials should be physically and chemically stable when subjected to high temperatures so that none of the materials will undesirably react with one another or with the semiconductor substrate; the metals and the isolation or insulation medium should tightly adhere to one another and there should be good "interlevel" ohmic contact between the last metallic film of one level and the first film of the next level at conductive cross points.

It is therefore an object of the present invention to provide a new and improved contact and interconnection scheme for semiconductor devices, particularly semiconductor devices of the integrated circuit type. It is yet another object of the invention to provide a new and improved process for fabricating a multilevel interconnection system for integrated circuits, which results in increased electrical insulation between levels and increased adherence between layers of metal.

The novel features believed characteristic of this invention are set forth in the appended claims. The invention itself, however, as well as other objects and advantages thereof may best be understood by reference to the following detailed description when read in conjunction with the accompanying drawings, wherein:

All of the figures are not necessarily to scale, but in some instances the dimensions have been exaggerated for clarity of illustration and to emphasize particular features of the invention.

Figure 1:
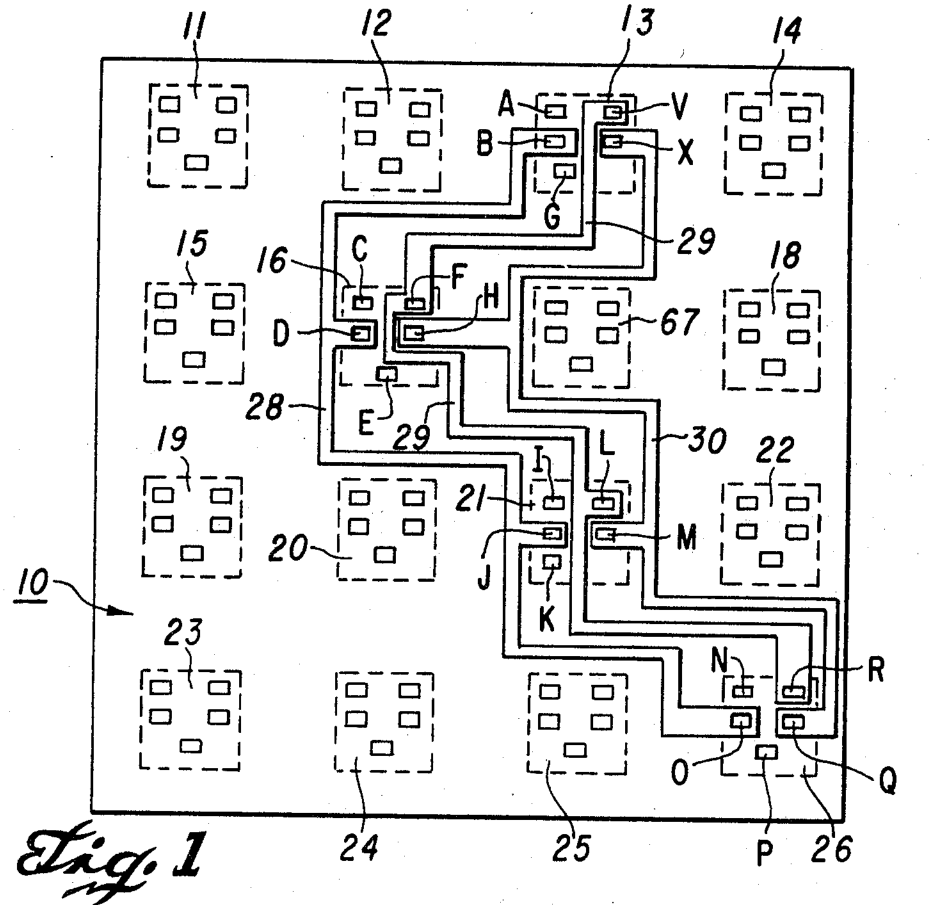
FIGURE 1 is a plan view, greatly enlarged, of a semiconductor wafer or slice containing a plurality of functional elements and adapted for use in practicing this invention.
Figure 2:
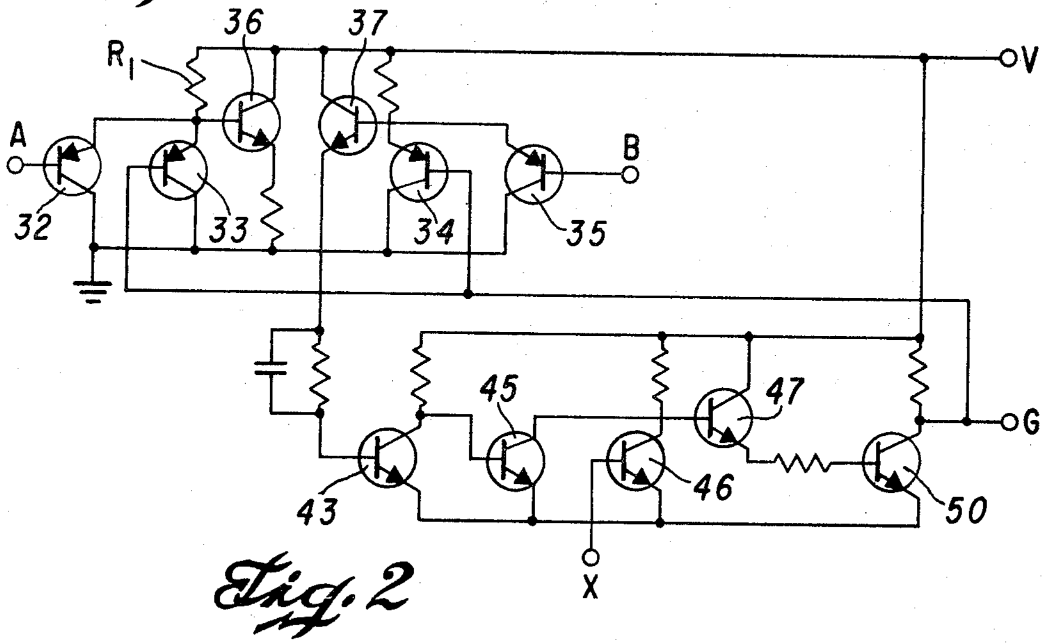
FIGURE 2 is a schematic diagram of the electronic circuit in one of the functional elements shown in FIGURE 1.
Figure 3:
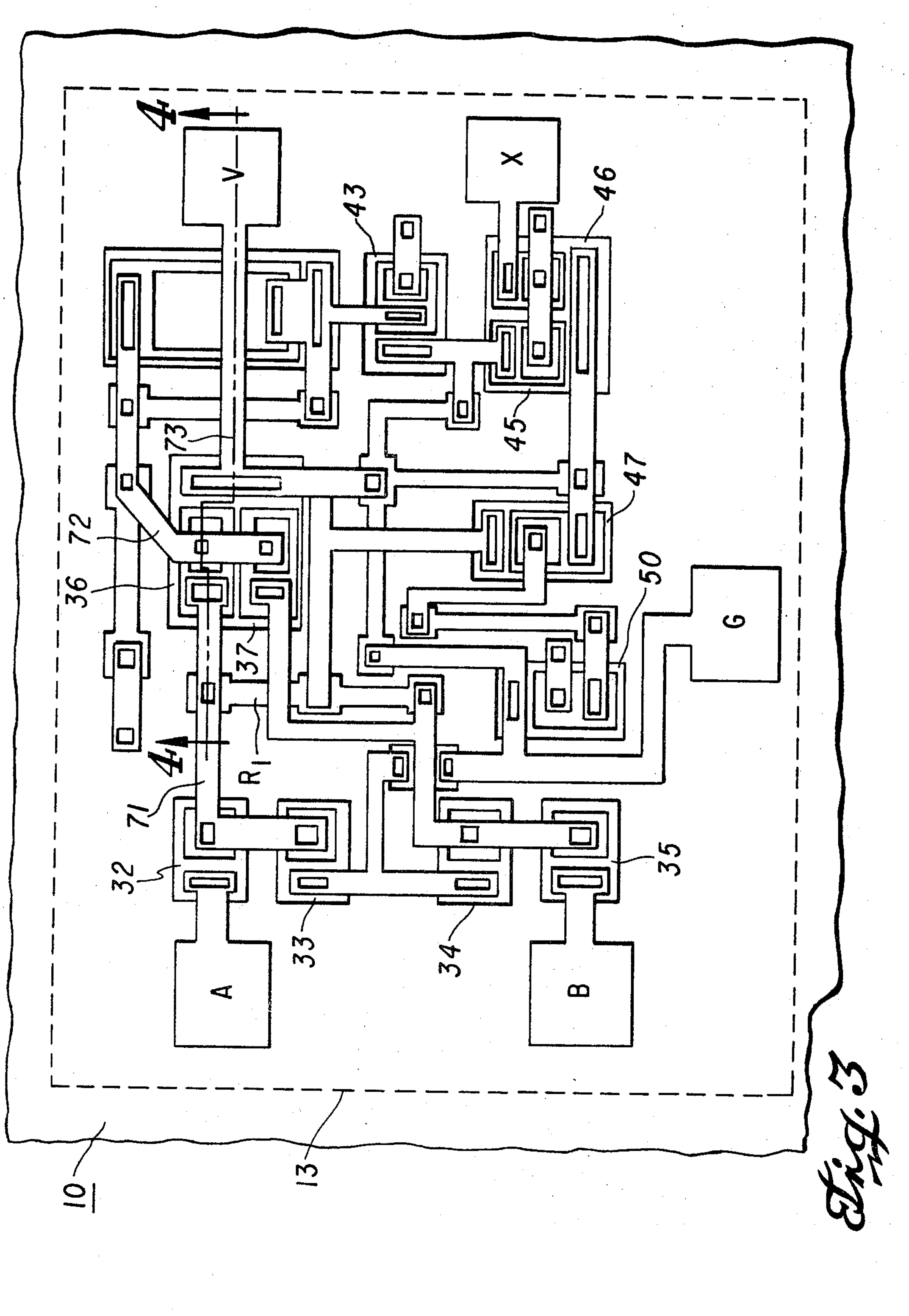
FIGURE 3 is a plan view, greatly enlarged, of the layout of circuit components in one of the functional elements in the wafer of FIGURE 1, these same circuit components being illustrated in schematic diagram form in FIGURE 2.

Referring now to the drawings, a slice or wafer substrate 10 of semiconductor material, in this example silicon semiconductor material, is illustrated in FIGURE 1, having a number of functional elements therein. Although only sixteen such functional elements are shown for illustration, ordinarily a much larger number is utilized. Each of the functional elements 11–26 contains the necessary number of transistors, resistors, capacitors or the like, interconnected to produce a desired electrical circuit function. For example, the functional element 13 may comprise the circuit shown schematically in FIGURE 2 and by plan view in FIGURE 3. The circuit of this functional element 13 would then include the P-N-P transistors 32, 33, 34 and 35 and the N-P-N transistors 36, 37, 43, 45, 46, 47 and 50, the three input terminals A, B, and X, and an output terminal G. These terminals, along with the voltage supply terminal V, would correspond to the five identically designated terminals on the functional element 13 in FIGURE 1.

Let us assume that it is desired to appropriately electrically interconnect the four functional elements 13, 16,

21 and 26 of the sixteen functional elements 11–26 for their cooperative action to produce a unitary electrical function. As depicted in FIGURE 1, therefore, the terminals B, D, J and O of functional elements 13, 16, 21 and 26, respectively, are electrically interconnected by the interconnector 28; similarly, the terminals V, F, L and R are electrically interconnected by the interconnector 29, and the terminals X, H, M and Q are electrically interconnected by the interconnector 30. Recognizing that there are already a large number of first level electrical interconnections joining the various transistors with one another as well as with the other circuit components and terminals to provide the individual functional element, for example, the one shown in FIGURE 3, it will be appreciated that the interconnectors 28, 29 and 30 must necessarily overlie and cross over some of the first level metal interconnection pattern shown in FIGURE 3. For this reason, and also because the interconnections between functional elements are preferably made in an operation separate from the one by which the interconnections within an element are formed, the interconnection pattern for FIGURE 1 is formed as a second level, separated from the first level interconnection pattern by an insulating medium.

Figure 4:
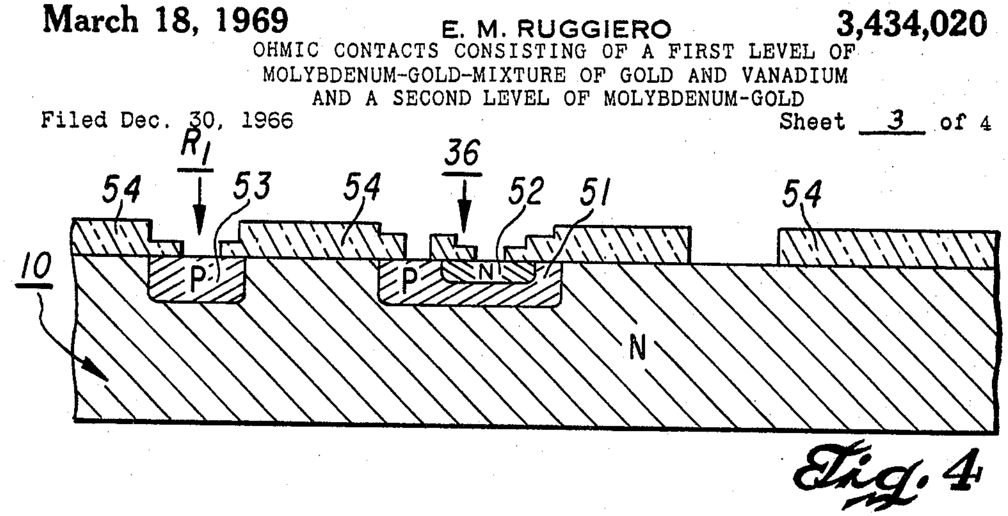
FIGURES 4–9 are sectional views of a portion of the integrated circuit structure shown in FIGURE 3 taken along the section line 4—4, showing subsequent steps in the provision of the multilevel interconnection system of the present invention.

The transistors and the other circuit components may be formed within or upon the semiconductor substrate 10 by any of the techniques known in the integrated circuit art such as, for example, epitaxial growth or diffusion. Thus, in FIGURE 4 there is depicted, in section, a portion of the integrated circuit structure of FIGURE 3 before the application of any of the metal interconnectors. The N-P-N transistor 36 comprises an N-type collector formed by the substrate 10, the diffused P-type base region 51, and N-type diffused emitter region 52. The resistor R is, provided by the P-type diffused region 53, formed simultaneously with the base region 51 of the transistor. A protective coating 54, for example silicon oxide or silicon nitride, on the top surface of the substrate acquires a stepped configuration, as shown, due to the successive diffusion operations. Thereafter, apertures or holes 54*a*, 54*b*, 54*c*, and 54*d* are formed in the oxide coating 54 where the first level interconnection ohmic contacts are to be made.

Figures 5, 6:
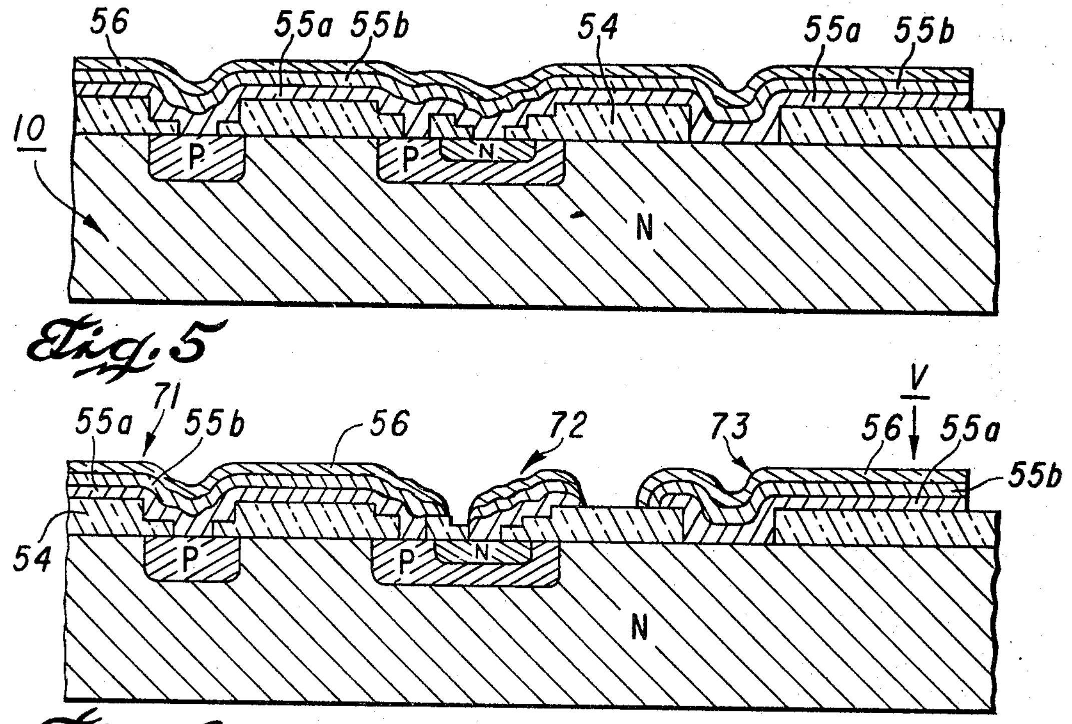

The next fabrication operation in accordance with this invention involves the formation of the first level metal interconnection pattern to interconnect the various regions of the active and passive devices of the integrated circuit with one another. While various kinds of individual metals as aluminum or molybdenum, for example, or combinations of metals, may be utilized as the first level interconnector, a preferred embodiment of this invention utilizes the metals molybdenum and gold in combination due to the many superior properties that this combination offers. Many of these properties are discussed in U.S. Patent No. 3,290,570, issued Dec. 6, 1966, and assigned to the assignee of the present application. Accordingly, a first layer 55*a* of a thickness of 2000 angstroms, for example, formed of molybdenum is deposited upon the surface of the oxide layer 54 and in ohmic contact with the semiconductor material within and through the apertures of holes 54*a*, 54*b*, 54*c* and 54*d* in the oxide layer, as seen in FIGURE 5. Various techniques may be utilized for the deposition of the molybdenum film 55*a*, for example, sputtering, evaporation, or sublimation; one technique being described more particularly in the above-mentioned patent. Thereafter, a thin gold film 55*b* is evaporated, for example, to a thickness of 5000 angstroms over the molybdenum film 55*a*. These two metal films in combination, therefore, provide the material of the first level ohmic contacts and, when selectively etched to define the first level interconnection pattern, ohmically join the various regions of the illustrated components with one another.

Prior to deposition of the molybdenum film 55*a*, it may be desirable to perform very shallow diffusions of impurities at the points of contact between the molybdenum film and the semiconductor surface to provide low resistivity ohmic contact at these points. Alternatively, or in addition, instead of depositing the molybdenum film directly upon the semiconductor surface, regions or zones of metallic material may be deposited intermediate the silicon surface the molybdenum film. These metallic regions may be, for example, platinum-silicide deposits formed on the contact areas prior to the deposition of the molybdenum film, or a flash or very thin layer of aluminum applied prior to the deposition of the molybdenum film. Furthermore, the metal films 55*a* and *b* need not necessarily be of only pure molybdenum or gold layers, but each may have a minor percentage of impurities added thereto. For example, trace impurities may be added to the molybdenum film to increase its conductivity while the gold film may have a minor percentage of platinum added thereto to increase the adhesion of the gold to the molybdenum.

As the next step in the process, and in accordance with a specific feature of the present invention, a very thin film 56 of oxidizable metal is deposited, by evaporation or sputtering, for example, upon the gold film 55*b* to a thickness of approximately 2500 angstroms. While various oxidizable metals may be utilized, it has been found particularly advantageous to form the layer 56 of vanadium due to its compatibility with silicon dioxide and the solubility of vanadium in gold, the latter feature and its utility to be discussed below.

Using conventional photographic masking and etching techniques known in the art, the molybdenum and gold films 55*a* and *b*, and the overlying vanadium film 56 are selectively removed to provide a first level pattern of ohmic contacts and interconnections including the metal intreconnectors 71, 72 and 73 composed of the molybdenum and gold layers, the interconnector 71 ohmically connecting the base of the transistor 36 to one end of the resistor $R_1$, the interconnector 72 making ohmic contact to the emitter of the transistor 36; while the interconnector 73 ohmically connects the collector of the transistor 36 to the supply terminal V, as illustrated in FIGURE 6, each of these interconnectors 71, 72 and 73, therefore, having extremely thin films 56 of vanadium formed thereover.

Figure 7:
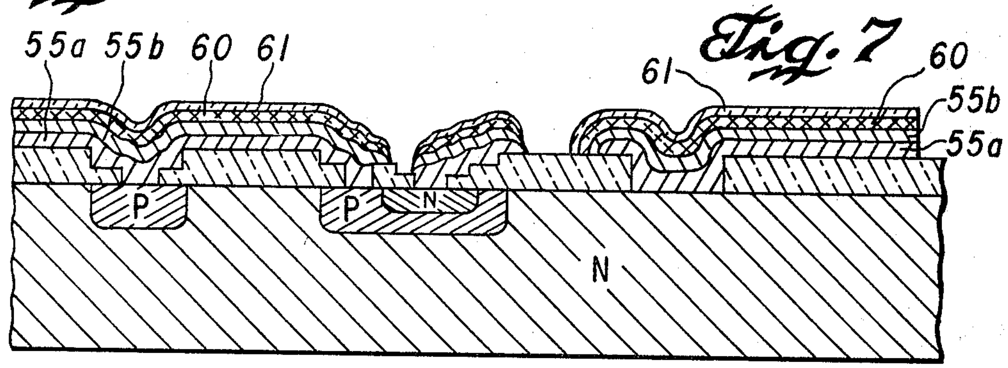

The entire assembly of FIGURE 6 is then placed in an oxygen atmosphere for about sixty minutes at approximately 450° C. to thermally oxidize the vanadium layer 56. As a consequence of this heating operation, a thin film 61 of vanadium oxide is genetically formed from the top surface of the vanadium film 56. During and simultaneously with oxidation, the remaining underlying portion of the vanadium film 56 directly adjacent the gold layer 55 dissolves into the gold to form a gold-vanadium intermetallic layer 60, to which the genetically formed vanadium oxide layer 61 is adherent. As a consequence, therefore, the structure illustrated in FIGURE 7 is produced.

Figure 8:
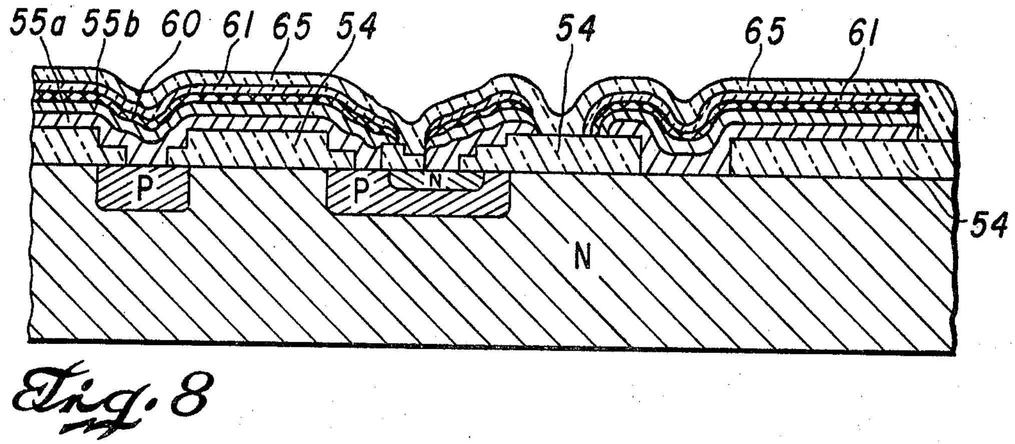

A layer 65 of insulating medium is then deposited to a thickness of approximately 6000 angstroms for example, by any suitable technique, for example evaporation, sputtering or electron beam deposition upon the vanadium oxide film 61, and upon the exposed portion of the oxide layer 54, as depicted in FIGURE 8. The layer 65 may be of various inorganic materials such as silicon nitride, aluminum oxide, tantalum oxide, or various organic insulating materials, but in this particular example, the insulating layer 65 is of silicon dioxide deposited by reacting oxygen with silane ($SiH_4$) in vapor form at approximately 325° C. The resulting structure shown in FIGURE 8 provides the advantage of two distinctly different insulating or semi-insulating layers of oxides 61 and 65 sandwiched together to avoid any congruent pinholes, thereby increasing the integrity of the electrical isolation between the first level interconnectors and the second level or metal layers subsequently deposited. In addition, the gold-vanadium intermetallic layer 60 increases the adherence of the vanadium oxide layer to the gold film 55*b*, the insulating layer 65 also tightly adhering to the vanadium oxide film 61.

Figure 9:
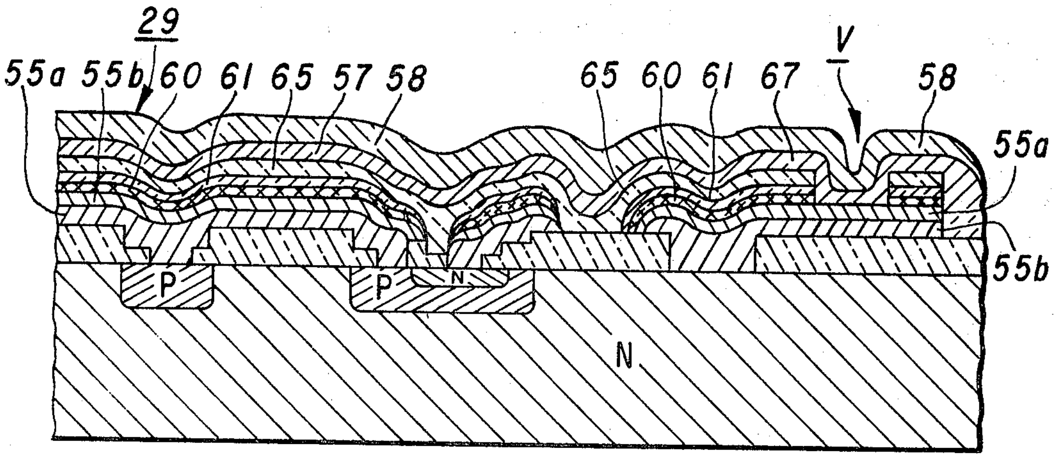

The insulating layer 65, the vanadium oxide film 61, and the gold-vanadium layer 61, are then selectively etched at the bonding pad V to expose the top surface of the gold film 55*b*. The second level interconnector 29 is then deposited, as illustrated in FIGURE 9, ohmically contacting the exposed surface of the gold film 55*b* and being insulated from the first level interconnection pattern by the double oxide layers 65 and 61. While this second level interconnector 29 may be formed of various metals or combination of metals, a preferred embodiment utilizes a first thin film 57 of molybdenum formed to a thickness of 2000 angstroms, for example and an overlying film 58 of gold. The top layer 58, being of gold, has an extremely high conductivity and allows an external gold wire to be thermocompression bonded to this gold film.

If a three, four, or higher level contact and interconnection system is desired, a vanadium film may then be formed over the gold film 58 instead of a gold wire and an identical process carried out as previously described in order to isolate the higher levels from the other, the final level being of the molybdenum-gold combination with the external ball-bonded wire to the final gold layer. Of course, instead of the ball-bonded wire, the structure may be inverted and mounted on a metallized ceramic substrate, the metallization on the ceramic substrate making ohmic contact to the final level metallization.

As an alternative embodiment, the final level interconnector 29 may be formed by the selective formation of from 250 to 500 angstroms of vanadium deposited directly upon the insulating layer 65 followed by a film of from 5000 to 6250 angstroms of gold, for example, these films then being heated to cause at least a portion of the gold to dissolve into the top surface of the vanadium film while the remainder of the vanadium adheres to the insulating oxide film 55, the resulting interconnector 29 thereby being formed of a layer of vanadium in intimate contact with the oxide film 55, a vanadium-gold intermetallic overlying the vanadium, and a pure gold layer overlying the vanadium-gold intermetallic.

While the oxidation of the top surface of the thin film vanadium layer to vanadium oxide, and the simultaneous interdiffusion of the vanadium with the gold layer provides a structure having the above-described advantages, a potential disadvantage associated with the process is the reduction of conductivity associated with the diffusion of the vanadium into the gold, producing the vanadium-gold layer having a lower conductivity than the one of pure gold. It has been found desirable, therefore, to so control the oxidation process that the vanadium oxide formation proceeds at a substantially greater rate than the gold-vanadium compound formation to thereby limit the thickness of the vanadium-gold intermetallic layer and consequently any decrease in conductivity. Two distinct techniques have been utilized to achieve this favorable oxidation rate. The first involves the control of both oxidation temperature and oxygen flow. Specifically, it has been observed that by maintaining the oxygen flow rate at approximately 1.5 cubic foot/hour and the temperature of oxidation below 450° C., the ratio of the rate of the oxidation of the vanadium to the rate of the interdiffusion with the gold is maintained at an optimum value.

Figure 10:
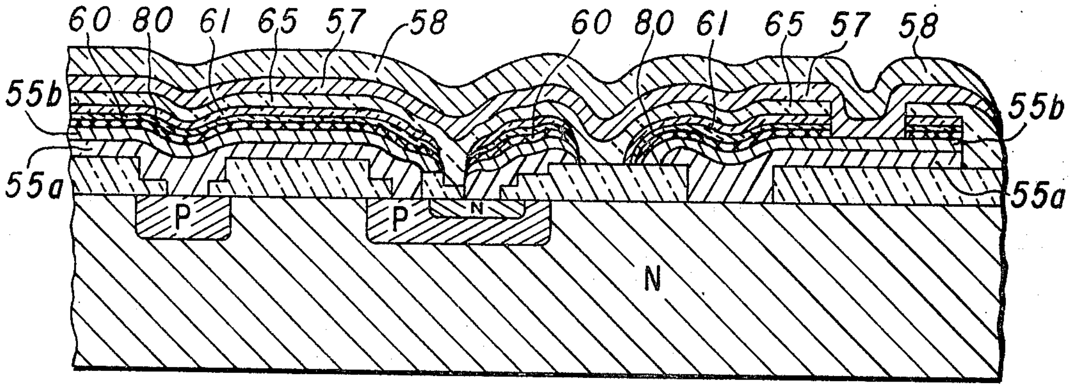
FIGURE 10 is a sectional view of another embodiment of the present invention.

As an alternative technique, however, and as a specific feature of the invention, it has been observed that by depositing a thin film or flash of molybdenum to a thickness of approximately 1000 angstroms intermediate the gold film 55*b* and the vanadium film 61 and then carrying out the oxidation step as previously described, the thin flash of molybdenum retards or slows down the diffusion of the vanadium into the gold, thereby allowing substantially all of the vanadium to be converted to the oxide, vanadium oxide, before much of the vanadium can diffuse through the molybdenum film to the gold. The molybdenum film also simultaneously oxidizes during the operation resulting in the structure shown in FIGURE 10, whereby a very thin layer 80 of molybdenum oxide is left intermediate the extremely thin interdiffused vanadium-gold film 60 and the vanadium oxide film 71. As a consequence of this technique, it has been observed that even though an extremely thin film 60 of a vanadium-gold intermetallic does form adjacent the gold film 55*b*, there is no detectable decrease in overall electrical conductivity associated with the combined layers 55*b* and 60 from that of the sole layer 55*b*. In addition, the molybdenum oxide film 80 provides additional electrical insulation between levels.

While the present invention has been directed toward providing multilevel interconnections to either monolithic or hybrid integrated circuits, the processes and resulting structures described may have other applications, such as in the area of discrete components or during the fabrication of thin film capacitors; or whenever it is desired to provide alernating layers or thin films of metal and electrical insulating material adjacent one another. Various other modifications of the disclosed processes and embodiments will become apparent to persons skilled in the art without departing from the spirit and scope of the invention as defined by the appended claims.

What is claimed is:

1. An ohmic contact and electrical interconnection arrangement for a semiconductor integrated circuit of the type having a plurality of circuit components formed by semiconductor regions extending to one face of a body of semiconductor material, a protective coating of insulating material upon said one face, each region including at least one P-N junction extending to the said one face beneath said protective coating, said arrangement comprising a first film essentially of molybdenum ohmically engaging and electrically interconnecting select ones of said regions through apertures in said protective coating, a second film essentially of gold overlying said first film, a third intermetallic film of a mixture of gold and vanadium overlying said second film, and a vanadium oxide film overlying said third intermetallic film.

2. An integrated circuit semiconductor device, comprising:

(a) a body of semiconductor material, (b) a plurality of circuit components within said body formed by overlying regions of opposite conductivity type with P-N junctions intermediate said regions extending to a major surface of said body, (c) a protective coating of insulating material upon said major surface, (d) a plurality of first level interconnectors ohmically engaging and electrically interconnecting select ones of said regions through openings in said protective coating, at least one of said first level interconnectors extending out over said protective coating to a given position spaced from said P-N junctions, each of said first level interconnectors comprising a first thin film essentially of molybdenum, and a second thin film essentially of gold overlying said first thin film, (e) an intermetallic layer of a mixture of vanadium and gold overlying said second thin film, (f) a second level interconnector ohmically connected with said at least one first level interconnector at said given position, and (g) a layer of vanadium oxide over said intermetallic layer and a layer of insulating medium over said vanadium oxide layer electrically isolating said first and second level interconnectors from one another except at said given position.

3. The device as described in claim 2 wherein a portion of said second thin film essentially of gold is exposed at said given position and wherein said second level interconnector comprises a first film essentially of molybdenum in direct contact with said layer of insulating medium and said portion, and another film essentially of gold overlying said first film of said second level interconnector.

4. The device as described in claim 3 wherein said protective coating and said layer of insulating medium are of an oxide of silicon and said body is of silicon semiconductor material.

5. A contact and interconnection arrangement for a semiconductor network of the type having a plurality of circuit components formed within a body of silicon semiconductor material having a protective coating upon one face of said body, and at least a first and second level of ohmic interconnections electrically interconnecting select regions of select ones of said circuit components, said first level of interconnections comprising a first layer of molybdenum ohmically engaging the surface of said select regions within openings in said protective coating and a second layer of gold overlying said first layer, an intermetallic film of a mixture of vanadium and gold overlying said second layer, a molybdenum oxide film overlying said intermetallic film, a vanadium oxide film overlying said molybdenum oxide film, said second level of interconnection comprising a first film of molybdenum and a second film of gold overlying said first film, and a silicon dioxide layer overlying said vanadium oxide film intermediate said first and second level of interconnections, at least one of said first level of interconnections connected with at least one of said second level of interconnections, said first film of molybdenum of said second level directly contacting an exposed portion of said second layer of gold of said first level.

6. The assembly as described in claim 5 including another metallic region intermediate the surface of said select regions and said first layer of molybdenum.

7. The assembly as described in claim 6 wherein said another metallic region is aluminum.

8. The assembly as described in claim 6 wherein said another metallic region is platinum silicide.

9. A contact and interconnection arrangement for a semiconductor network of the type having a plurality of circuit components formed within a body of silicon semiconductor material and at least a first and second level of metallic interconnections ohmically interconnecting select regions of certain of said circuit components, said first level of metallic interconnections having a first layer of a mixture of vanadium and gold thereover, a vanadium oxide film over said first layer, and a layer of silicon dioxide over said vanadium oxide layer, said second level of interconnection extending over and in direct contact with said layer of silicon dioxide to contact at least one of said first level interconnections through an aperture in said silicon dioxide layer, said first layer, and said vanadium oxide layer.

References Cited

UNITED STATES PATENTS

| | | | |
|---|---|---|---|
| 3,325,702 | 6/1967 | Cunningham | 317—234 |
| 3,341,753 | 9/1967 | Cunningham | 317—234 |
| 3,290,570 | 12/1966 | Cunningham | 317—240 |
| 3,365,628 | 1/1968 | Luxem | 317—234 |
| 3,290,565 | 12/1966 | Hastings | 317—234 |
| 3,370,207 | 2/1968 | Fabel | 317—234 |

JOHN W. HUCKERT, *Primary Examiner.*

M. EDLOW, *Assistant Examiner.*

U.S. Cl. X.R.

117—212; 29—590